US012734673B2

(12) United States Patent

Sun et al.

(10) Patent No.: US 12,734,673 B2

(45) Date of Patent: Sep. 15, 2026

(54) METHOD AND APPARATUS FOR CONTROLLING MASTER-SLAVE ARM ROBOT

(71) Applicant: Innolcon Medical Technology (Suzhou) Co., Ltd., Suzhou (CN)

(72) Inventors: Yi Sun, Suzhou (CN); Pengfei Zhong, Suzhou (CN); Wei Luo, Suzhou (CN)

(73) Assignee: Innolcon Medical Technology (Suzhou) Co., Ltd., Suzhou (CN)

( * ) Notice: Subject to any disclaimer, the term of this patent is extended or adjusted under 35 U.S.C. 154(b) by 44 days.

(21) Appl. No.: 18/995,293

(22) PCT Filed: Feb. 27, 2023

(86) PCT No.: PCT/CN2023/078377

§ 371 (c)(1),
(2) Date: Jan. 16, 2025

(87) PCT Pub. No.: WO2024/021599

PCT Pub. Date: Feb. 1, 2024

(65) Prior Publication Data

US 2026/0131450 A1 May 14, 2026

(30) Foreign Application Priority Data

Jul. 29, 2022 (CN) ........................ 202210910678.8

(51) Int. Cl.

*B25J 9/16* (2006.01)
*B25J 3/04* (2006.01)

(52) U.S. Cl.

CPC ............... *B25J 3/04* (2013.01); *B25J 9/1628* (2013.01)

(58) Field of Classification Search

CPC ................................ B25J 3/04; B25J 9/1628

See application file for complete search history.

(56) References Cited

U.S. PATENT DOCUMENTS 7,620,477 B2 * 11/2009 Bruemmer ............. G06N 3/008 700/262
11,775,983 B2 * 10/2023 Yim ....................... G06Q 10/02 705/15

(Continued)

FOREIGN PATENT DOCUMENTS

CN 106003034 A 10/2016
CN 106137400 A 11/2016

(Continued)

OTHER PUBLICATIONS

International Search Report and English Translation of International Search Report corresponding to International Patent Application No. PCT/CN2023/078377 mailed Jun. 13, 2023.

*Primary Examiner* — Masud Ahmed

(74) *Attorney, Agent, or Firm* — Armstrong Teasdale LLP

(57) ABSTRACT

Embodiments of the present application provide a control method and device of a master-slave-manipulator robot. The method includes: after acquiring a mapped position and a starting motion parameter of the slave-manipulator motor for the current cycle, performing planning on a motion trajectory of the slave-manipulator motor for the current cycle and acquiring a maximum planning distance, and finally determining a value that may be prioritized among the mapped motion distance and the maximum planning distance as an actual distance that the slave-manipulator motor needs to move for the current cycle. In this way, it is possible to avoid the problem of an error warning of the motor due to exceeding of a limit of the slave-manipulator motor caused by the master manipulator being directly mapped to the slave-manipulator motor, so that an excessive acceleration and velocity during motion of the master manipulator motion may be decreased to an acceptable level of the slave-manipulator motor while it is ensured that the (Continued)

overall trajectory remains substantially unchanged, thus prolonging a service life of the slave-manipulator motor.

22 Claims, 5 Drawing Sheets

(56) References Cited

U.S. PATENT DOCUMENTS

| | | | | |
|---|---|---|---|---|
| 2010/0198402 | A1 * | 8/2010 | Greer | B25J 3/04<br>901/41 |
| 2018/0296285 | A1 * | 10/2018 | Simi | A61B 10/04 |
| 2019/0143506 | A1 * | 5/2019 | Rabindran | B25J 3/04<br>700/253 |
| 2021/0086364 | A1 * | 3/2021 | Handa | G06V 20/56 |

FOREIGN PATENT DOCUMENTS

| | | | | |
|---|---|---|---|---|
| CN | 111856942 | A | 10/2020 | |
| CN | 112057172 | A | 12/2020 | |
| JP | H04372380 | A | 12/1992 | |
| WO | WO-2016034269 | A1 * | 3/2016 | G05B 19/42 |
| WO | WO 2017125994 | A1 | 7/2017 | |

* cited by examiner

METHOD AND APPARATUS FOR CONTROLLING MASTER-SLAVE ARM ROBOT

CROSS-REFERENCE TO RELATED APPLICATIONS

This application is a U.S. National Phase Application of International Patent Application No. PCT/CN23/78377, filed Feb. 27, 2023, which claims priority to Chinese Patent Application No. 202210910678.8, filed Jul. 29, 2022, each of which is hereby incorporated by reference herein.

TECHNICAL FIELD

The present application relates to the field of robotics, and in particular to a control method and device of a master-slave-manipulator robot.

BACKGROUND

Human hands often have limitations when performing micro-scale operations, such as the occurrence of subtle hand motions such as hand tremors. In order to overcome the limitations of the human hand in micro-scale operations, the master-slave-manipulator robot that can replace part of the work of the human hand has been developed.

The master-slave-manipulator robot mainly includes a master manipulator and a slave manipulator corresponding to the master manipulator, wherein the master manipulator is completely controlled by an operator and faithfully reflects motion parameter of the operator's hand, and the slave manipulator is typical a robotic arm with at least one joint thereon, where a motor is provided on each joint. In actual control, motion parameter for the motors of the slave manipulator are obtained by mapping from three-dimensional coordinates of the master manipulator (typical a set point on the master manipulator), where the motion of the master manipulator is mapped and transferred to the slave manipulator through a mechanical structure of the master-slave-manipulator robot, finally so that a target set point (e.g., end point) of the slave manipulator follows the master manipulator to perform a corresponding motion.

By the above control method, the motion parameter of each motor of the slave manipulator is obtained by mapping directly from the motion of the master manipulator. However, because the acceleration of the human hand is typical much faster than that of the motors, when the acceleration generated in some cases, e.g., sudden reverse acceleration of the motion while moving rapidly in the first direction, is mapped to a slave-manipulator motor, a maximal rotational acceleration of the slave-manipulator motor may be exceeded, which may lead to error warning of the motor and so that the slave manipulator cannot follow the master manipulator accurately, or a life of the motor of the slave manipulator is affected.

SUMMARY

Prior control methods may have the technical problem that a rotational acceleration for a slave-manipulator motor upon mapping may are beyond a maximal acceleration, which in turn causes an error warning of the motor, resulting in the slave manipulator not being able to accurately follow the master manipulator for motion, or the motor life of the slave manipulator being affected. In order to solve this problem, embodiments of the present application provide a control method and device of a master-slave-manipulator robot, specifically, the present application discloses the following technical solution:

In a first aspect, embodiments of the present application provide a control method of a master-slave-manipulator robot, at least one slave-manipulator motor being provided on a slave manipulator of the master-slave-manipulator robot, the method is used for controlling motion of the slave-manipulator motor and comprises:

- acquiring a mapped position of the slave-manipulator motor for a current cycle, wherein the mapped position is used for indicating a number of mapped rotational pulses, which is acquired by direct mapping based on three-dimensional coordinates of a master manipulator of the master-slave-manipulator robot and a mechanical structure of the master-slave-manipulator robot, the three-dimensional coordinates of the master manipulator being acquired at a preset acquisition cycle, and the current cycle being any acquisition cycle;
- acquiring a starting motion parameter of the slave-manipulator motor for the current cycle, the starting motion parameter comprising a starting velocity $V_s$ and a starting acceleration $A_s$;
- performing planning on a motion trajectory of the slave-manipulator motor for the current cycle based on the starting motion parameter;
- acquiring a maximum planning distance $P_{cm}$ of the slave-manipulator motor for the current cycle;
- determining, as a target distance, a value that is able to be reached preferentially among a mapped motion distance and the maximum planning distance $P_{cm}$, from an actual position of the slave-manipulator motor for a previous cycle based on the starting motion parameter, wherein the mapped motion distance is a difference between the mapped position of the slave-manipulator motor for the current cycle and the actual position of the slave-manipulator motor for the previous cycle, the actual position being used for indicating a number of actual rotational pulses, and the previous cycle being a previous-one acquisition cycle of the current cycle; and
- determining, as an actual position of the slave-manipulator motor for the current cycle, a sum of the actual position of the slave-manipulator motor for a previous cycle and the target distance.

In combination with the first aspect, in one implementable way of the first aspect, it further comprises:

- determining actual three-dimensional coordinates of the slave manipulator for the current cycle based on the actual position of the slave-manipulator motor for the current cycle;
- detecting whether the actual three-dimensional coordinates are beyond maximal coordinates of the slave manipulator; and
- if the actual three-dimensional coordinates are not beyond the maximal coordinates of the slave manipulator, controlling the slave-manipulator motor to move to the actual position for the current cycle.

In combination with the first aspect, in one implementable way of the first aspect, it further comprises:

- if the actual three-dimensional coordinates are beyond the maximal coordinates of the slave manipulator, acquiring a corrected position of the slave-manipulator motor for the current cycle based on the maximal coordinates of the slave manipulator; and
- controlling the slave-manipulator motor to move to a corrected position for the current cycle.

In combination with the first aspect, in one implementable way of the first aspect, before controlling the slave-manipulator motor to move, it further comprises:

- if multi-axis motions of respective ones of the slave manipulators of the master-slave-manipulator robot are not synchronized for the current cycle, acquiring target positions of the slave-manipulator motors on the respective ones of the slave manipulators by using an inverse kinematic solution method based on target three-dimensional coordinates of the respective ones of the slave manipulators for the current cycle and the mechanical structure of the master-slave-manipulator robot;
- acquiring target three-dimensional coordinates of the master manipulator based on the target position of the slave-manipulator motor on each of the slave manipulators;
- if the target three-dimensional coordinates of the master manipulator are beyond maximal coordinates of the master manipulator, correcting the three-dimensional coordinates of the master manipulator for the current cycle to the maximal coordinates of the master manipulator; and
- reacquiring, based on the maximal coordinates of the master manipulator, the mapped position of the slave-manipulator motor for the current cycle until the actual position of the slave-manipulator motor for the current cycle is re-determined.

In combination with the first aspect, in one implementable way of the first aspect, it further comprises:

- if the target three-dimensional coordinates of the master manipulator are not beyond the maximal coordinates of the master manipulator, correcting the three-dimensional coordinates of the master manipulator for the current cycle to the target three-dimensional coordinates of the master manipulator; and
- reacquiring, based on the target three-dimensional coordinates of the master manipulator, the mapped position of the slave-manipulator motor for the current cycle until the actual position of the slave-manipulator motor for the current cycle is re-determined.

In combination with the first aspect, in one implementable way of the first aspect, the acquiring a starting motion parameter of the slave-manipulator motor for the current cycle comprises:

- acquiring actual positions of the slave-manipulator motor for three acquisition cycles previous to the current cycle, respectively; and
- determining the starting velocity $V_s$ and the starting acceleration $A_s$ based on the actual positions of the slave-manipulator motor for the three acquisition cycles previous to the current cycle.

In combination with the first aspect, in one implementable way of the first aspect, the determining the starting velocity $V_s$ and the starting acceleration $A_s$ based on the actual positions of the slave-manipulator motor for the three acquisition cycles previous to the current cycle comprises:

- determining a first average velocity of the slave-manipulator motor for the previous cycle based on a difference between a first actual position and a second actual position and a duration of the acquisition cycle, the first actual position being an actual position of the slave-manipulator motor for the previous cycle, and the second actual position being an actual position of the slave-manipulator motor for the previous-one acquisition cycle of the previous cycle;
- determining a second average velocity of the slave-manipulator motor for the previous-one acquisition cycle of the previous cycle based on a difference between the second actual position and a third actual position and the duration of the acquisition cycle, the third actual position being an actual position of the slave-manipulator motor for a third acquisition cycle previous to the current cycle;
- determining an average acceleration based on the second average velocity, the first average velocity and the duration of the acquisition cycle; and
- determining the first average velocity as the starting velocity $V_s$, and determining the average acceleration as the starting acceleration $A_s$.

In combination with the first aspect, in one implementable way of the first aspect, before performing planning on a motion trajectory of the slave-manipulator motor for the current cycle based on the starting motion parameter, the method further comprises:

- determining a first motion direction of the slave-manipulator motor for the current cycle based on a mapped position of the slave-manipulator motor for the current cycle and an actual position of the slave-manipulator motor for the previous cycle;
- determining a second motion direction of the slave-manipulator motor for the previous cycle based on the actual position of the slave-manipulator motor for the previous cycle and the actual position of the slave-manipulator motor for a previous-one acquisition cycle of the previous cycle; and
- detecting whether the first motion direction is the same as the second motion direction.

In combination with the first aspect, in one implementable way of the first aspect, when the first motion direction is the same as the second motion direction, the performing planning on a motion trajectory of the slave-manipulator motor for the current cycle based on the starting motion parameter comprises:

- detecting whether the starting velocity $V_s$ is equal to the maximal velocity $V_m$ of the slave-manipulator motor; and
- if the starting velocity $V_s$ is equal to the maximal velocity $V_m$, performing planning on the motion trajectory of the slave-manipulator motor for the current cycle to move uniformly motion at the maximal velocity $V_m$ until ending of the current cycle.

In combination with the first aspect, in one implementable way of the first aspect, it further comprises:

- if the starting velocity $V_s$ is less than the maximal velocity $V_m$, detecting whether the starting acceleration $A_s$ is equal to the maximal acceleration $A_m$,
- if the starting acceleration $A_s$ is equal to the maximal acceleration $A_m$, determining a first duration required to accelerate uniformly to the maximal velocity $V_m$ from the starting velocity $V_s$ at the maximal acceleration $A_m$; and
- if the first duration is less than a duration of the current cycle, performing planning on the motion trajectory of the slave-manipulator motor for the current cycle to first accelerate uniformly to the maximal velocity $V_m$ at the maximal acceleration $A_m$, and then to move uniformly at the maximal velocity $V_m$ for the remaining duration of the current cycle until the ending of the current cycle.

In combination with the first aspect, in one implementable way of the first aspect, it further comprises:

if the first duration is greater than the duration of the current cycle, performing planning on the motion trajectory of the slave-manipulator motor for the current cycle to accelerate uniformly from the starting velocity $V_s$ at the maximal acceleration $A_m$ until the ending of the current cycle.

In combination with the first aspect, in one implementable way of the first aspect, it further comprises:

if the starting acceleration $A_s$ is less than the maximal acceleration $A_m$, determining a second duration required to accelerate to the maximal acceleration $A_m$ from the starting acceleration $A_s$ at a first jerk;

if the second duration is less than the duration of the current cycle, acquiring an intermediate velocity at the ending of the second duration;

if the intermediate velocity is less than the maximal velocity $V_m$, determining a third duration required to accelerate uniformly to the maximal velocity $V_m$ from the intermediate velocity at the maximal acceleration $A_m$; and if a sum of the second duration and the third duration is less than the duration of the current cycle, performing planning on the motion trajectory of the slave-manipulator motor for the current cycle to first accelerate to the maximal acceleration $A_m$ at the first jerk, then to accelerate uniformly to the maximal velocity $V_m$ at the maximal acceleration $A_m$, and finally to move uniformly at the maximal velocity $V_m$ for the remaining duration of the current cycle until the ending of the current cycle.

In combination with the first aspect, in one implementable way of the first aspect, it further comprises:

if the sum of the second duration and the third duration is greater than the duration of the current cycle, performing planning on the motion trajectory of the slave-manipulator motor for the current cycle to first accelerate to the maximal acceleration $A_m$ from the starting acceleration $A_s$, and then to accelerate uniformly at the maximal acceleration $A_m$ for the remaining duration of the current cycle until the ending of the current cycle.

In combination with the first aspect, in one implementable way of the first aspect, it further comprises:

if the intermediate velocity is greater than the maximal velocity $V_m$, performing planning on the motion trajectory of the slave-manipulator motor for the current cycle to perform a uniform jerk to the maximal velocity $V_m$ from the starting velocity $V_s$ at the first jerk, and then to move uniformly at the maximal velocity $V_m$ for the remaining duration of the current cycle until the ending of the current cycle.

In combination with the first aspect, in one implementable way of the first aspect, it further comprises:

if the second duration is greater than the duration of the current cycle, determining an end velocity to which a uniform jerk is performed from the starting velocity $V_s$ at the first jerk until the ending of the current cycle; and if the end velocity is less than the maximal velocity $V_m$, performing planning on the motion trajectory of the slave-manipulator motor for the current cycle to perform a uniform jerk from the starting velocity $V_s$ at the first jerk until the ending of the current cycle.

In combination with the first aspect, in one implementable way of the first aspect, it further comprises:

if the end velocity is greater than the maximal velocity $V_m$, performing planning on the motion trajectory of the slave-manipulator motor for the current cycle to perform an uniform jerk to the maximal velocity $V_m$ from the starting velocity $V_s$ at the first jerk, and then to move uniformly at the maximal velocity $V_m$ for the remaining duration of the current cycle until the ending of the current cycle.

In combination with the first aspect, in one implementable way of the first aspect, the acquiring the maximum planning distance $P_{cm}$ from the manipulator motor for the current cycle comprises:

determining, as the maximum planning distance $P_{cm}$ of the slave-manipulator motor for the current cycle, a total motion distance traveled by the slave-manipulator motor for the current cycle.

In combination with the first aspect, in one implementable way of the first aspect, when the first motion direction is opposite to the second motion direction, said the performing planning on a motion trajectory of the slave-manipulator motor for the current cycle based on the starting motion parameter comprises:

detecting, based on the starting motion parameter and a second jerk, whether the slave-manipulator motor is able to decelerate to zero from the starting velocity $V_s$ for the current cycle;

if the slave-manipulator motor is able to decelerate to zero from the starting velocity $V_s$ for the current cycle, acquiring an intermediate position and an intermediate acceleration of the slave-manipulator motor when the slave-manipulator motor decelerates to zero from the starting velocity $V_s$; and performing planning on the motion trajectory of the slave-manipulator motor for the remaining duration of the current cycle based on the motion parameter of the slave-manipulator motor at the intermediate position and the remaining duration of the current cycle, wherein the slave-manipulator motor at the intermediate position has a starting velocity of zero and a starting acceleration as the intermediate acceleration.

In combination with the first aspect, in one implementable way of the first aspect, it further comprises:

if the slave-manipulator motor is not able to decelerate to zero from the starting velocity $V_s$ for the current cycle, detecting whether the slave-manipulator motor is able to reach the maximum acceleration in a deceleration section for the current cycle; and if the slave-manipulator motor is able to reach the maximum acceleration in the deceleration section for the current cycle, performing planning on the motion trajectory of the slave-manipulator motor for the current cycle to first decelerate to the maximum acceleration in the deceleration section at the second jerk, and then to move by a uniform deceleration for the remaining duration of the current cycle until the ending of the current cycle.

In combination with the first aspect, in one implementable way of the first aspect, it further comprises:

if the slave-manipulator motor is not able to reach the maximum acceleration in the deceleration section for the current cycle, performing planning on the motion trajectory of the slave-manipulator motor for the current cycle to move by a deceleration at the second jerk until the ending of the current cycle.

In combination with the first aspect, in one implementable way of the first aspect, the acquiring a maximum planning distance $P_{cm}$ of the slave-manipulator motor for the current cycle comprises:

acquiring an end position of the slave-manipulator motor at the ending of the current cycle; and determining, as the maximum planning distance $P_{cm}$ of the slave-manipulator motor for the current cycle, a difference between the end position and the actual position of the slave-manipulator motor for the previous cycle.

In a second aspect, embodiments of the present application provide a control device of a master-slave-manipulator robot, where at least one slave-manipulator motor is provided on a slave manipulator of the master-slave-manipulator robot, the device is configured to control motion of the slave-manipulator motor and comprises:

a mapping position acquisition module configured for acquiring a mapping position of the slave-manipulator motor for a current cycle, wherein the mapping position is used for indicating a number of mapped rotational pulses, which is acquired by direct mapping based on three-dimensional coordinates of the master manipulator and a mechanical structure of the master-slave-manipulator robot, the three-dimensional coordinates of the master manipulator being acquired at a preset acquisition cycle, and the current cycle being any acquisition cycle;

a starting motion parameter acquisition module configured for acquiring a starting motion parameter of the slave-manipulator motor for the current cycle, the starting motion parameter comprising a starting velocity $V_s$ and a starting acceleration $A_s$;

a motion planning module configured for performing planning on a motion trajectory of the slave-manipulator motor for the current cycle based on the starting motion parameter;

a maximum planning distance acquisition module configured for acquiring a maximum planning distance $P_{cm}$ of the slave-manipulator motor for the current cycle;

a target distance determination module configured for determining, as a target distance, a value that is able to be reached preferentially among a mapped motion distance and the maximum planning distance $P_{cm}$, from an actual position of the slave-manipulator motor for a previous cycle based on the starting motion parameter, wherein the mapped motion distance is a difference between the mapped position of the slave-manipulator motor for the current cycle and the actual position of the slave-manipulator motor for the previous cycle, the actual position being used for indicating a number of actual rotational pulses, and the previous cycle being a previous-one acquisition cycle of the current cycle; and an actual position determination module configured for determining, as an actual position of the slave-manipulator motor for the current cycle, a sum of the actual position of the slave-manipulator motor for a previous cycle and the target distance.

Embodiments of the present application provide a control method and device of a master-slave-manipulator robot. In the method, a virtual axis between the master manipulator and the slave manipulator is added, after acquiring a mapped position and a starting motion parameter of the slave-manipulator motor for the current cycle by using the virtual axis, planning on a motion trajectory of the slave-manipulator motor for the current cycle is performed and a maximum planning distance is acquired, and finally a value that may be prioritized among the mapped motion distance and the maximum planning distance is determined as an actual distance that the slave-manipulator motor needs to move for the current cycle. In this way, it is possible to avoid the problem of an error warning of the motor due to exceeding of a limit of the slave-manipulator motor caused by the master manipulator being directly mapped to the slave-manipulator motor, so that an excessive acceleration and velocity during motion of the master manipulator motion may be decreased to an acceptable level of the slave-manipulator motor while it is ensured that the overall trajectory remains substantially unchanged, thus prolonging a service life of the slave-manipulator motor.

DETAILED DESCRIPTION OF THE EMBODIMENTS

Figure 1:
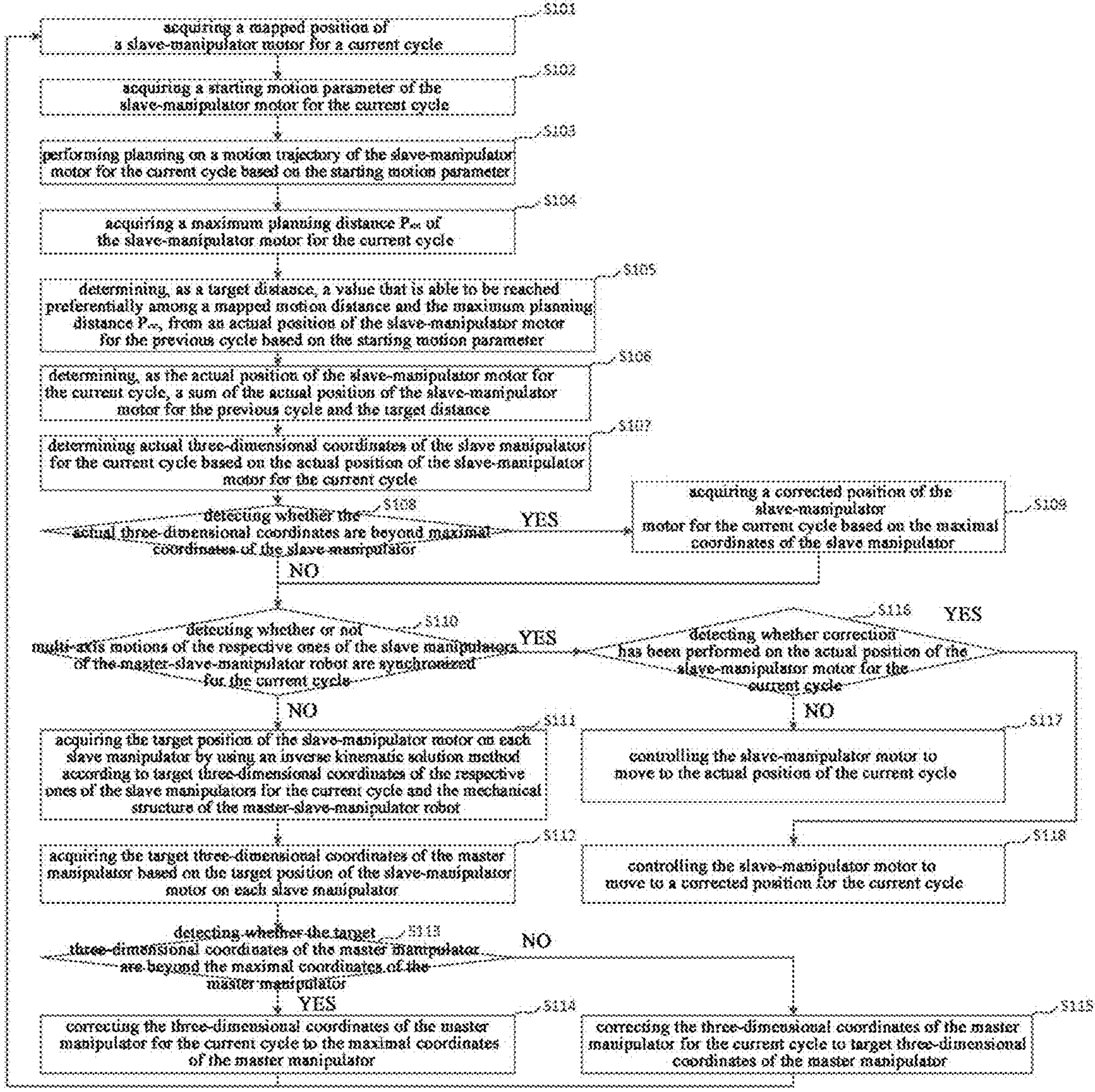
FIG. 1 shows a schematic flowchart of a control method of a master-slave-manipulator robot according to an embodiment of the present application.

In order to make the purpose, technical solutions and advantages of the present application clearer, the embodiments of the present application will be further described in detail in conjunction with the accompanying drawings.

In order to solve technical problems occurring in a conventional control method that a rotational acceleration for a slave-manipulator motor upon mapping may are beyond a maximal acceleration, which in turn causes an error warning of the motor, resulting in the slave manipulator not being able to accurately follow the master manipulator for motion, or the motor life of the slave manipulator being affected, the present application discloses a control method for a master-slave-manipulator robot according to the following embodiments. The control method according to the embodiments of the present application is applicable to a master-slave-manipulator robot. The master-slave-manipulator robot includes a master manipulator and at least one slave manipulator, each of which being corresponding to one master manipulator, and all of which may be in synchronous motion. Each slave manipulator is provided with at least one slave-manipulator motor. The control method according to embodiments of the present application is specifically configured to control the motion of any one of the slave-manipulator motors. In order to more clearly describe the embodiments of the present application, a specific description is made for an example that only one slave manipulator is corresponding to the master manipulator and only one slave-manipulator motor is provided on the slave manipulator, unless otherwise specifically stated thereafter.

Prior to introducing the embodiments of the present application, some of the concepts referred to in the embodiments of the present application are first described.

The master manipulator referred to in the embodiments of the present application may denote a certain set point on the master manipulator, which may be located in a palm or a finger end, which may be determined according to experience and the actual situation, and on which no specific limitation is made by embodiments of the present application. The three-dimensional coordinates of the master manipulator indicate spatial three-dimensional coordinates of the set point. The slave manipulator referred to in the embodiments of the present application may denote a target set point on the slave manipulator, for example, an end point on the slave manipulator, which may be determined according to experience and the actual situation, and on which no specific limitation is made by embodiments of the present application. The three-dimensional coordinates of the slave manipulator indicate spatial three-dimensional coordinates of the target set point, and are in the same spatial coordinate system as the three-dimensional coordinates of the master manipulator. The position of the slave-manipulator motor indicates a number of rotational pulses of the slave-manipulator motor, the motion of the slave-manipulator motor refers to rotation, the velocity of the slave-manipulator motor refers to rotation velocity, the acceleration of the slave-manipulator motor refers to a rotational acceleration, and the direction of the motion of the slave-manipulator motor involves forward rotation and reverse rotation.

A control method of a master-slave-manipulator robot according to embodiments of the present application is described below in conjunction with the accompanying drawings.

Referring to the schematic flowchart shown in FIG. 1, a control method of a master-slave-manipulator robot according to an embodiment of the present application specifically comprises steps:

Step S101, acquiring a mapped position of a slave-manipulator motor for a current cycle.

The mapping position is used for indicating a number of mapped rotational pulses, which is obtained by direct mapping based on the three-dimensional coordinates of the master manipulator and the mechanical structure of the master-slave-manipulator robot. The three-dimensional coordinates of the master manipulator are acquired at a preset acquisition cycle. The current cycle is any acquisition cycle. Specifically, the acquisition cycle may be preset according to a demand and the actual situation, on which no specific limitation is made by the embodiments of the present application. The three-dimensional coordinates of the master manipulator refer to the spatial coordinates of the position of the master manipulator at a time of ending of each acquisition cycle. The mapped position of the slave-manipulator motor for the current cycle refers to the mapped position of the slave-manipulator motor at a time of ending of the current cycle.

Step S102, acquiring a starting motion parameter of the slave-manipulator motor for the current cycle. The starting motion parameter includes a starting velocity $V_s$ and a starting acceleration $A_s$.

In one implementation of step S102, the actual positions of the slave-manipulator motor in each of first three acquisition cycles previous to the current cycle may first be obtained. Next, the starting velocity $V_s$ and the starting acceleration $A_s$ are determined based on the actual positions of the slave-manipulator motor in the three acquisition cycles previous to the current cycle, wherein a first actual position of the slave-manipulator motor in a previous cycle refers to the actual position of the slave-manipulator motor at a time of ending of the previous cycle; a second actual position of the slave-manipulator motor in a previous cycle of the previous acquisition cycle is the actual position of the slave-manipulator motor at a time of ending of a previous acquisition cycle of the previous cycle; and a third actual position of the slave-manipulator motor in a previous acquisition cycle of the previous acquisition cycle of the previous cycle, i.e., the third actual position of the slave-manipulator motor in a third acquisition cycle previous to the current cycle, is the actual position of the slave-manipulator motor at a time of ending of the third acquisition cycle previous to the current cycle.

In one implementation of determining the starting velocity $V_s$ and the starting acceleration $A_s$, the starting velocity $V_s$ and the starting acceleration $A_s$ may be determined by following steps:

At a first step, a first average velocity of the slave-manipulator motor for the previous cycle is determined based on a difference between the first actual position and the second actual position and a duration T of the acquisition cycle.

Specifically, the first average velocity=(first actual position−second actual position)/T.

At a second step, a second average velocity of the slave-manipulator motor for the previous acquisition cycle of the previous cycle is determined based on a difference between the second actual position and the third actual position and the duration T of the acquisition cycle.

Specifically, the second average velocity=(second actual position−third actual position)/T.

At a third step, an average acceleration is determined based on the second average velocity, the first average velocity, and the duration T of the acquisition cycle.

$$\text{Specifically, the average acceleration} = (\text{first average velocity} - \text{second average velocity})/T.$$

At a fourth step, the first average velocity is determined as the starting velocity $V_s$, and the average acceleration is determined as the starting acceleration $A_s$.

Among other implementations of determining the starting velocity $V_s$ and starting acceleration $A_s$, other ways may be set to determine the velocity and acceleration according to the actual application scenarios. For example, an average value of the first average velocity and the second average velocity may be determined as the starting velocity $V_s$. Alternatively, the starting velocity $V_s$ is set to be $V_s$=the first average velocity+the average acceleration×the duration of the current cycle/2. Alternatively, the starting velocity $V_s$ and the starting acceleration $A_s$ may be obtained by a jerk. In this way, more application scenarios may be matched according to the actual situation, thus providing more flexibility. In addition, if the starting motion parameter is known, it may not be needed to calculate the starting motion parameter based on data of the first three cycles previous to the current cycle. In this way, data delay of the three cycles may be reduced, and the method according to the embodiments of the present application may be applied at any moment (e.g., in the case of a requirement that the master manipulator move past a certain position, or a master-slave-manipulator linkage may not be performed until a specific period of time elapses, etc.), with a wider adaptability.

Alternatively, before performing step S103 after step S102, the control method according to the embodiment of the present application may further comprise: first, determining a first motion direction of the slave-manipulator motor for the current cycle based on the mapped position of the slave-manipulator motor for the current cycle $P_4$ and the actual position of the slave-manipulator motor for the previous cycle $P_3$. Exemplarily, the slave-manipulator motor has the mapped position $P_4$ for the current cycle indicating 10,000 pulses and the actual position $P_3$ for the previous cycle indicating 5,000 pulses, the first motion direction is determined to be a forward rotation; and if the slave-manipulator motor has the mapped position $P_4$ for the current cycle indicating 5,000 pulses and the actual position $P_3$ for the previous cycle indicating 10,000 pulses, the first motion direction is determined to be reverse rotation. Then, based on the actual position $P_3$ of the slave-manipulator motor for the previous cycle and the actual position $P_1$ of the slave-manipulator motor for the previous acquisition cycle of the previous cycle, a second motion direction of the slave-manipulator motor for the previous cycle is determined. Finally, it is detected whether the first motion direction is the same as the second motion direction. The actual position is used for indicating an actual number of rotation pulses. The previous cycle is the previous acquisition cycle of the current cycle.

Step S103, performing planning on a motion trajectory of the slave-manipulator motor for the current cycle based on the starting motion parameter.

Figure 2:
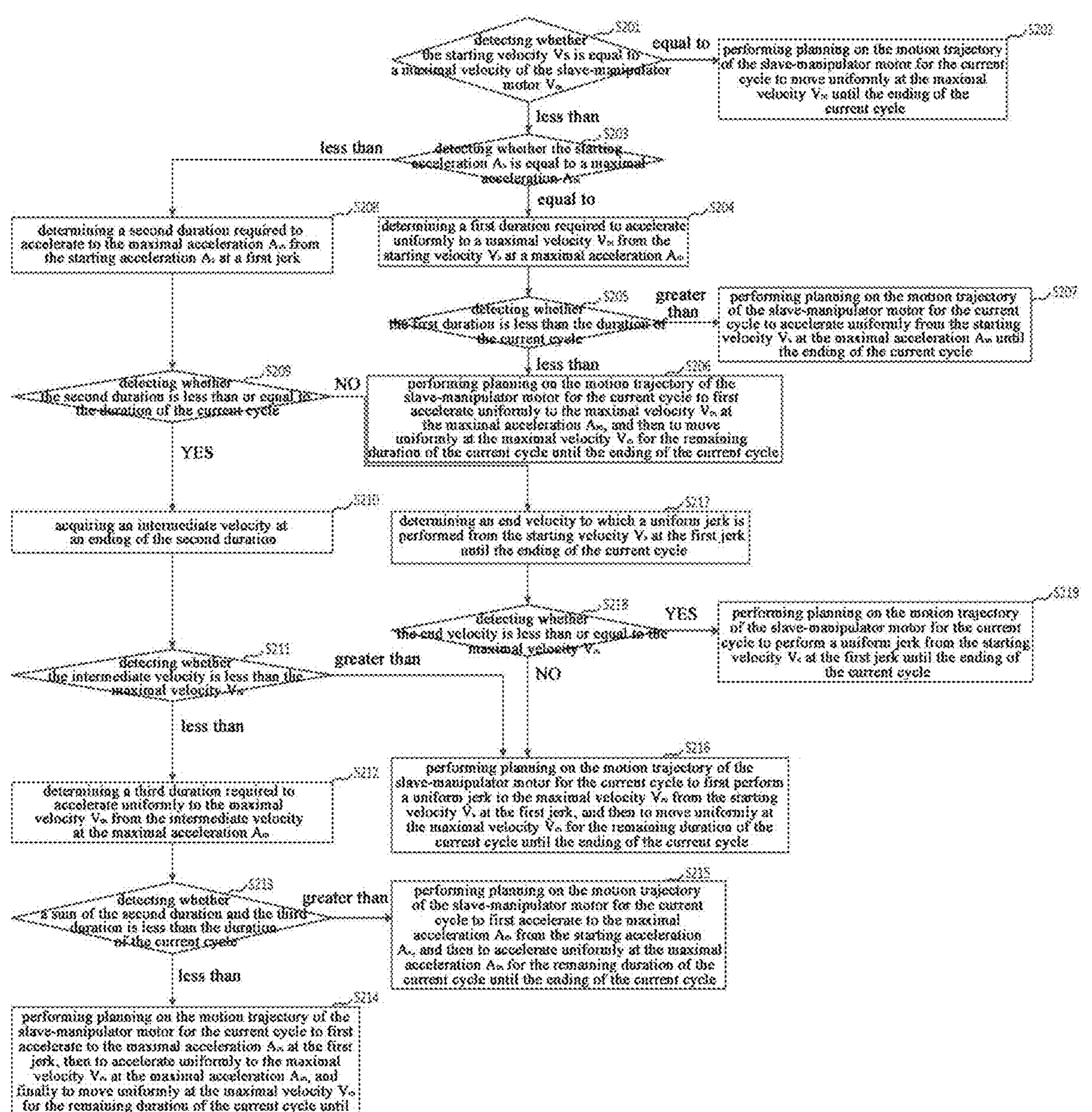
FIG. 2 shows a schematic flowchart, for one implementation of step S103, of a control method of a master-slave-manipulator robot according to an embodiment of the present application.

FIG. 2 shows a schematic flowchart, for one implementation of step S103, of a control method of a master-slave-manipulator robot according to an embodiment of the present application. In the case where the first motion direction is the same as the second motion direction, as shown in FIG. 2, at step S103 the planning may be performed based on an S-shaped velocity curve by the following implementations:

Step S201, detecting whether the starting velocity $V_s$ is equal to a maximal velocity of the slave-manipulator motor $V_m$. If the starting velocity $V_s$ is equal to the maximal velocity $V_m$, proceeding to step S202; and if the starting velocity $V_s$ is less than the maximal velocity $V_m$, proceeding to step S203.

It should be noted that if a situation occurs where the starting velocity $V_s$ is greater than the maximal velocity $V_m$, an error warning of the slave-manipulator motor will be generated, so a case where the starting velocity $V_s$ is greater than the maximal velocity $V_m$ does not generally occur, and will not be described separately in the embodiments of this application.

Step S202, performing planning on the motion trajectory of the slave-manipulator motor for the current cycle to move uniformly at the maximal velocity $V_m$ until the ending of the current cycle.

Step S203, detecting whether the starting acceleration $A_s$ is equal to a maximal acceleration $A_m$. If the starting acceleration $A_s$ is equal to the maximal acceleration $A_m$, proceeding to step S204; and if the starting acceleration $A_s$ is less than the maximal acceleration $A_m$, proceeding to step S208.

It should be noted that if a situation occurs where the starting acceleration $A_s$ is greater than the maximal acceleration $A_m$, an error warning of the slave-manipulator motor will be generated, so a case where the starting acceleration $A_s$ is greater than the maximal acceleration $A_m$ does not generally occur, and will not be separately described in the embodiments of this application.

Step S204, determining a first duration required to accelerate uniformly to a maximal velocity $V_m$ from the starting velocity $V_s$ at a maximal acceleration $A_m$.

Specifically, the first duration $T_1$ may be determined by the following formula:

$$T_1 = (V_m - V_s)/A_m \quad \text{Formula (1)}$$

Step S205, detecting whether the first duration is less than the duration of the current cycle. If the first duration is less than the duration of the current cycle, proceeding to step S206; and if the first duration is greater than the duration of the current cycle, proceeding to step S207.

In addition, if the first duration is equal to the duration of the current cycle, performing planning to accelerate uniformly at to the maximal velocity $V_m$ at the maximal acceleration $A_m$. The case where the first duration is equal to the duration of the current cycle will not be described separately.

Step S206, performing planning on the motion trajectory of the slave-manipulator motor for the current cycle to first accelerate uniformly to the maximal velocity $V_m$ at the maximal acceleration $A_m$, and then to move uniformly at the maximal velocity $V_m$ for the remaining duration of the current cycle until the ending of the current cycle.

In the case, the slave-manipulator motor may reach the maximal velocity $V_m$ for the current cycle, so the planning is performed that a uniform acceleration is performed first and then a uniform motion follows.

Step S207, performing planning on the motion trajectory of the slave-manipulator motor for the current cycle to accelerate uniformly from the starting velocity $V_s$ at the maximal acceleration $A_m$ until the ending of the current cycle.

In this case, the slave-manipulator motor is unable to reach the maximal velocity $V_m$ for the current cycle, so the planning is performed to accelerate uniformly for the entire of the cycle at maximum capacity.

Step S208, determining a second duration required to accelerate to the maximal acceleration $A_m$ from the starting acceleration $A_s$ at a first jerk.

Specifically, the second duration $T_a$ may be determined by the following formula:

$$T_a = (A_m - A_s)/J_1 \quad \text{Formula (2)}$$

Where $J_1$ denotes the first jerk, indicating a preset jerk in a uniform jerk section and having a value which is positive.

Step S209, detecting whether the second duration is less than or equal to the duration of the current cycle. If the second duration is less than or equal to the duration of the current cycle, proceeding to step S210; and if the second duration is greater than the duration of the current cycle, proceeding to step S217.

Step S210, acquiring an intermediate velocity at an ending of the second duration.

Specifically, the intermediate velocity V at the ending of the second duration may be determined by the following formula:

$$V = V_s + 1/2 \times J_1 \times T_a^2 \quad \text{Formula (3)}$$

Where $T_a$ denotes the second duration, $J_1$ denotes the first jerk, and $V_s$ denotes the starting velocity.

Step S211, detecting whether the intermediate velocity is less than the maximal velocity $V_m$. If the intermediate velocity is less than the maximal velocity $V_m$, proceeding to step S212; and if the intermediate velocity is greater than the maximal velocity $V_m$, proceeding to step S216.

In addition, if the intermediate velocity is equal to the maximal velocity $V_m$, the planning is performed to perform a uniform jerk to the maximal velocity $V_m$ from the starting velocity $V_s$ at the first jerk. In this case, the slave-manipulator motor reaches both a maximum velocity and a maximum acceleration.

Step S212, determining a third duration required to accelerate uniformly to the maximal velocity $V_m$ from the intermediate velocity at the maximal acceleration $A_m$.

Specifically, the third duration $T_3$ may be determined by the following formula:

$$T_3 = (V_m - V)/A_m \quad \text{Formula (4)}$$

Where V denotes the intermediate velocity.

Step S213, detecting whether a sum of the second duration and the third duration is less than the duration of the current cycle. If so, proceeding to step 214; and if not, proceeding to step 215.

In addition, if the sum of the second duration and the third duration is equal to the duration of the current cycle, the planning is performed to accelerate to the maximal acceleration $A_m$ at the first jerk, and then accelerate uniformly to the maximal velocity $V_m$ at the maximal acceleration $A_m$.

Step S214, performing planning on the motion trajectory of the slave-manipulator motor for the current cycle to first accelerate to the maximal acceleration $A_m$ at the first jerk, then to accelerate uniformly to the maximal velocity $V_m$ at the maximal acceleration $A_m$, and finally to move uniformly at the maximal velocity $V_m$ for the remaining duration of the current cycle until the ending of the current cycle.

In this case, the slave-manipulator motor may reach both the maximal velocity $V_m$ and the maximal acceleration $A_m$ for the current cycle.

Step S215, performing planning on the motion trajectory of the slave-manipulator motor for the current cycle to first accelerate to the maximal acceleration $A_m$ from the starting acceleration $A_s$, and then to accelerate uniformly at the maximal acceleration $A_m$ for the remaining duration of the current cycle until the ending of the current cycle.

In this case, the slave-manipulator motor may reach the maximal acceleration $A_m$, but may not reach the maximal velocity $V_m$ for the current cycle.

Step S216, performing planning on the motion trajectory of the slave-manipulator motor for the current cycle to first perform a uniform jerk to the maximal velocity $V_m$ from the starting velocity $V_s$ at the first jerk, and then to move uniformly at the maximal velocity $V_m$ for the remaining duration of the current cycle until the ending of the current cycle.

Where a duration Tv required to perform a uniform jerk to the maximal velocity $V_m$ from the starting velocity $V_s$ may be determined by the following formula:

$$T_v = \sqrt{2 \times (V_m - V_s)/J_1} \quad \text{Formula (5)}$$

Where $J_1$ denotes the first jerk.

In this case, for the current cycle, the slave-manipulator motor may not reach the maximal acceleration $A_m$, but may reach the maximal velocity $V_m$.

Step S217, determining an end velocity to which a uniform jerk is performed from the starting velocity $V_s$ at the first jerk until the ending of the current cycle.

Specifically, the end velocity Ve may be determined by the following formula:

$$V_e = V_s + 1/2 \times J_1 \times T^2 \quad \text{Formula (6)}$$

Where $J_1$ denotes the first jerk and T denotes the duration of the current cycle.

Step S218, detecting whether the end velocity is less than or equal to the maximal velocity $V_m$. If the end velocity is less than or equal to the maximal velocity $V_m$, proceeding to step S219; and if the end velocity is greater than the maximal velocity $V_m$, proceeding to step S216.

Step S219, performing planning on the motion trajectory of the slave-manipulator motor for the current cycle to perform a uniform jerk from the starting velocity $V_s$ at the first jerk until the ending of the current cycle.

In this case, if the end velocity is less than the maximal velocity $V_m$, the slave-manipulator motor will reach neither the maximal velocity $V_m$ nor the maximal acceleration $A_m$ for the current cycle.

In this way, through the above manner of planning on trajectory based on the S-shaped velocity curve, the velocity of the slave-manipulator motor may be made relatively smooth, without error warning, where the velocity and the acceleration may meet the parameter requirements of the motor of the system, and the motion trajectory may substantially follow the motion trajectory of the master manipulator.

Figure 3:
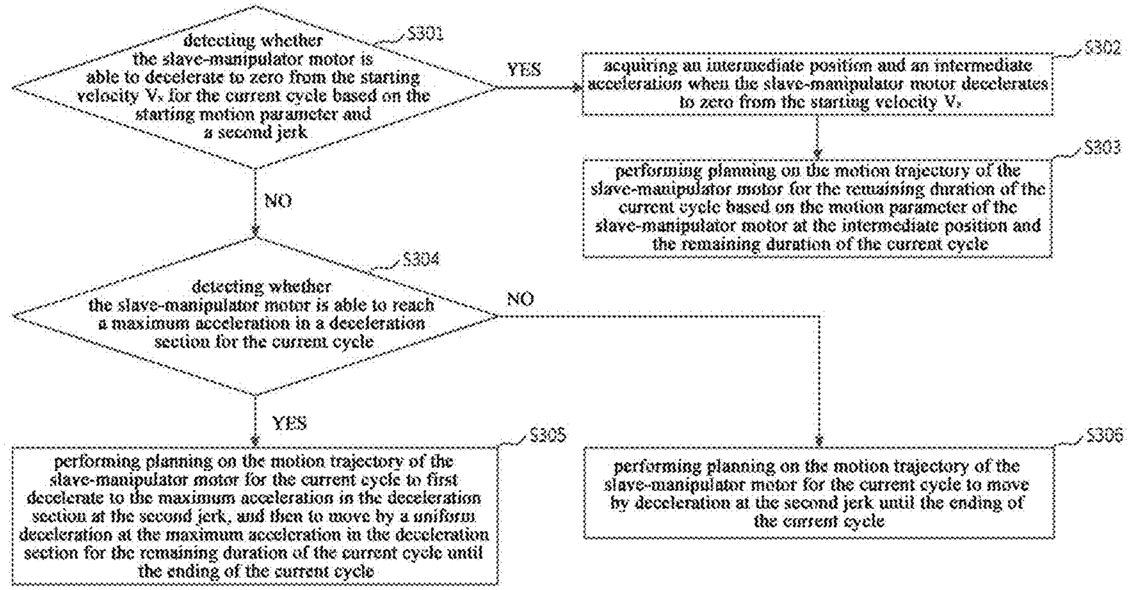
FIG. 3 shows a schematic flowchart, for another implementation of step S103, of a control method of a master-slave-manipulator robot according to an embodiment of the present application.

FIG. 3 shows a schematic flowchart, for another implementation of step S103, of a control method of a master-slave-manipulator robot according to an embodiment of the present application. In the case where the first motion direction is opposite to the second motion direction, as shown in FIG. 3, the step S103 may be performed by the following implementations:

Step S301, detecting whether the slave-manipulator motor is able to decelerate to zero from the starting velocity $V_s$ for the current cycle based on the starting motion parameter and a second jerk. If it is able to decelerate to zero from the starting velocity $V_s$, proceeding to step S302; and if it is not able to decelerate to zero from the starting velocity $V_s$, proceeding to step S304.

Where the second jerk represents a preset jerk in a uniform acceleration and deceleration section and has a value which is negative.

Step S302, acquiring an intermediate position and an intermediate acceleration when the slave-manipulator motor decelerates to zero from the starting velocity $V_s$.

Specifically, the intermediate position and intermediate acceleration may be solved after kinematic analysis based on the starting motion parameter of the slave-manipulator motor and a velocity when the intermediate position is reached, in conjunction with the second jerk.

Step S303, performing planning on the motion trajectory of the slave-manipulator motor for the remaining duration of the current cycle based on the motion parameter of the slave-manipulator motor at the intermediate position and the remaining duration of the current cycle. The slave-manipulator motor at the intermediate position has a starting velocity as zero and a starting acceleration as an intermediate acceleration.

Specifically, the manner of planning on the motion trajectory may refer to the aforementioned steps S201 to step S219, and will not be separately described herein.

Step S304, detecting whether the slave-manipulator motor is able to reach a maximum acceleration in a deceleration section for the current cycle. If so, proceeding to step S305; and if not, proceeding to step S306.

Specifically, a duration required for the slave-manipulator motor to decelerate from the starting motion parameter to the maximum acceleration in the deceleration section at the second jerk may first be determined. If the duration is greater than the duration of the current cycle, it is determined that the slave-manipulator motor is unable to reach the maximum acceleration in the deceleration section for the current cycle; and if not, it is determined that the slave-manipulator motor is able to reach the maximum acceleration in the deceleration section for the current cycle.

Step S305, performing planning on the motion trajectory of the slave-manipulator motor for the current cycle to first decelerate to the maximum acceleration in the deceleration section at the second jerk, and then to move by a uniform deceleration at the maximum acceleration in the deceleration section for the remaining duration of the current cycle until the ending of the current cycle.

Specifically, the fourth duration $T_4$ required to decelerate from the starting acceleration $A_s$ to the maximum acceleration in the deceleration section at the second jerk may be determined by the following formula:

$$T_4 = (A_{smd} - A_s)/J_2 \quad \text{Formula (7)}$$

Where $J_2$ denotes the second jerk, indicating a preset jerk in a uniform acceleration and deceleration section and having a value which is negative. $A_{smd}$ denotes the maximum acceleration in the deceleration section.

An intermediate velocity $V_2$ at the ending of the fourth duration $T_4$ may be determined by the following formula:

$$V_2 = V_s + 1/2 \times J_2 \times T_4^2 \quad \text{Formula (8)}$$

Where $T_4$ denotes the fourth duration, $J_2$ denotes the second jerk, and $V_s$ denotes the starting velocity.

Step S306, performing planning on the motion trajectory of the slave-manipulator motor for the current cycle to move by deceleration at the second jerk until the ending of the current cycle.

In this way, through the above manner of planning on trajectory based on the S-shaped velocity curve, the velocity of the slave-manipulator motor may be made relatively smooth, without error warning, where the velocity and the acceleration may meet the parameter requirements of the motor of the system, and the motion trajectory may substantially follow the motion trajectory of the master manipulator.

In addition, the planning on trajectory may be performed in other manners, e.g., based on a T-shaped velocity curve. In this way, the planning on trajectory may be more flexible and thus may have a wider range of applications.

It should be noted that, in the embodiment of the present application, when the current cycle is a starting acquisition cycle, the starting velocity and the starting acceleration of the slave-manipulator motor in the starting acquisition cycle each are set to zero, without motion planning to be performed. If the current cycle is an acquisition cycle after the starting acquisition cycle, step S103 may be performed to perform planning on motion trajectory, wherein, if the current cycle is the first cycle after the starting acquisition cycle, there is no need for detection of a motion direction, where the motion direction is directly defaulted to be the same as a direction of the previous cycle, and the starting velocity and starting acceleration each are set to zero. If the current cycle is a cycle after the first cycle after the starting acquisition cycle, the detection of motion direction is required first.

Step S104, acquiring a maximum planning distance $P_{cm}$ of the slave-manipulator motor for the current cycle.

Specifically, step S104 corresponds to the various manners of planning as aforementioned.

In one implementation, in the case where the first motion direction is the same as the second motion direction, a total motion distance of the slave-manipulator motor for the current cycle when the planning is performed on the motion trajectory of the slave-manipulator motor for the current cycle based on the above steps S201 to S219 may be determined as the maximum planning distance $P_{cm}$ of the slave-manipulator motor for the current cycle.

The calculation of the maximum planning distance Pan is described specifically below.

After performing step S202, the maximum planning distance $P_{cm}$ may be determined by the following formula:

$$P_{cm} = V_m \times T \quad \text{Formula (9)}$$

Where $V_m$ denotes the maximal velocity and T denotes the duration of the current cycle.

Furthermore, after performing step S206, the maximum planning distance $P_{cm}$ may be determined by the following formula:

$$P_{cm} = V_s \times T_1 + 1/2 \times A_m \times T_1^2 + V_m \times (T - T_1) \quad \text{Formula (10)}$$

Where $V_s$ denotes the starting velocity, $T_1$ denotes the first duration, $A_m$ denotes the maximal acceleration, $V_m$ denotes the maximal velocity and T denotes the duration of the current cycle.

Furthermore, after performing step S207, the maximum planning distance Pom may be determined by the following formula:

$$P_{cm} = V_s \times T + 1/2 \times A_m \times T^2 \quad \text{Formula (11)}$$

Where $V_s$ denotes the starting velocity, $A_m$ denotes the maximal acceleration, and T denotes the duration of the current cycle.

Furthermore, after performing step S214, the maximum planning distance $P_{cm}$ may be determined by the following formula:

$$P_{cm} = 1/6 \times J_1 \times T_a^3 + V_s \times T_a + V \times T_3 + 1/2 \times (V_m - V) \times T_3 + V_m \times (T - T_a - T_3). \quad \text{Formula (12)}$$

Where $J_1$ denotes the first jerk, $T_a$ denotes the second duration, $T_3$ denotes the third duration, T denotes the duration of the current cycle, V denotes the intermediate velocity at the ending of the second duration, $V_s$ denotes the starting velocity, and $V_m$ denotes the maximal velocity.

Furthermore, after performing step S215, the maximum planning distance $P_{cm}$ may be determined by the following formula:

$$P_{cm} = 1/6 \times J_1 \times T_a^3 + V_s \times T_a + V \times (T - T_a) + 1/2 \times A_m \times (T - T_a)^2 \quad \text{Formula (13)}$$

Where $J_1$ denotes the first jerk, $T_a$ denotes the second duration, T denotes the duration of the current cycle, V denotes the intermediate velocity at the ending of the second duration, $V_s$ denotes the starting velocity, and $A_m$ denotes the maximal acceleration.

Furthermore, after performing step S216, the maximum planning distance $P_{cm}$ may be determined by the following formula:

$$P_{cm} = 1/6 \times J_1 \times T_v^3 + V_s \times T_v + V_m \times (T - T_v) \quad \text{Formula (14)}$$

Where $J_1$ denotes the first jerk, $V_s$ denotes the starting velocity, $V_m$ denotes the maximal velocity, T denotes the duration of the current cycle, and Tv denotes the duration required to perform a uniform jerk to the maximal velocity $V_m$ from the starting velocity $V_s$, which may be determined by Formula (5).

In addition, after performing step S219, the maximum planning distance $P_{cm}$ may be determined by the following formula:

$$P_{cm} = 1/6 \times J_1 \times T^3 + V_s \times T \quad \text{Formula (15)}$$

where $J_1$ denotes the first jerk, $V_s$ denotes the starting velocity, and T denotes the duration of the current cycle.

In another implementation, in the case where the first motion direction is opposite to the second motion direction, when the planning is performed on the motion trajectory of the slave-manipulator motor for the current cycle based on the above steps S301 to S306, an end position of the slave-manipulator motor at the ending of the current cycle may be first obtained, and then a difference between the end position and the actual position of the slave-manipulator motor for the previous cycle may be determined as the maximum planning distance $P_{cm}$ of the slave-manipulator motor for the current cycle. Specifically, the end position is equal to the starting position of the slave-manipulator motor (i.e., the actual position for the previous cycle) plus the total motion distance for the current cycle. It should be noted that since a reverse motion is involved, the motion distance is a vector with directionality.

The calculation of the end position is described specifically below.

After performing step S303, the slave-manipulator motor first maintain the same direction as the starting velocity to perform a deceleration motion until the velocity is decreased to zero, and then to move in the reverse direction until the ending of the current cycle. The end position is a result obtained by adding the total motion distance in the deceleration section from the starting position of the manipulator motor and then subtracting the total motion distance of the reverse motion. For the planning on the motion trajectory of the reverse motion, it may be performed with reference to the aforementioned steps S201 to step S219, and for the total motion distance of the reverse motion, it may be calculated with reference to the calculation of the maximum planning distance corresponding to one of the implementations of step S104, which will not be repeated herein. It should be noted that a duration of the reverse motion is the remaining duration of the current cycle, and a starting velocity of the reverse motion is zero.

After performing step S305 and step S306, the slave-manipulator motor maintains the same direction as the starting velocity to perform a deceleration motion until the ending of the current cycle. At this time, the end position is the result obtained by adding the maximum planning distance $P_{cm}$ from the starting position of the manipulator motor.

Specifically, after performing step S305, the maximum planning distance $P_{cm}$ may be determined by the following formula:

$$P_{cm} = -1/6 \times J_2 \times T_4^3 + V_s \times T_4 + (V_2 - A_{smd} \times (T - T_4)) \times (T - T_4) + 1/2 \times A_{smd} \times (T - T_4)^2. \quad \text{Formula (16)}$$

Where $J_2$ denotes the second jerk, $V_s$ denotes the starting velocity, T denotes the duration of the current cycle, $T_4$ denotes the fourth duration, $V_2$ denotes the intermediate velocity at the ending of the fourth duration $T_4$, and $A_{smd}$ is the maximum acceleration in the deceleration section.

After performing step S306, the maximum planning distance $P_{cm}$ may be determined by the following formula:

$$P_{cm} = 1/6 \times J_2 \times T^3 + V_s \times T \quad \text{Formula (17)}$$

Where $J_2$ denotes the first jerk, $V_s$ denotes the starting velocity, and T denotes the duration of the current cycle.

Step S105, determining, as a target distance, a value that is able to be reached preferentially among a mapped motion distance and the maximum planning distance $P_{cm}$, from an actual position of the slave-manipulator motor for the previous cycle based on the starting motion parameter.

The mapped motion distance is a difference between the mapped position of the slave-manipulator motor for the current cycle and the actual position of the slave-manipulator motor for the previous cycle. The actual position is used for indicating the actual number of rotational pulses. The previous cycle is the previous acquisition cycle of the current cycle.

Exemplarily, the actual position of the slave-manipulator motor for the previous cycle indicates 5000 pulses, the mapped position of the slave-manipulator motor for the current cycle indicates 2000 pulses, and the mapped motion distance is −3000 pulses. When the planning are performed on the motion trajectory according to the starting motion parameter of the slave-manipulator motor, the slave-manipulator motor first proceeds to decelerate in the same direction as the starting velocity until the velocity is decreased to zero, with the intermediate position indicating 6500 pulses, and then moves in a reverse direction until the ending of the current cycle, with a final end position indicating 3000 pulses and the maximum mapped distance $P_{cm}$ being −2000 pulses. At this time, since the slave-manipulator motor needs to move in the reverse direction, it is necessary to decrease the velocity to zero before moving in the reverse direction, thereby the value that may be reached preferentially after moving in the reverse direction from 5000 pulses is −2000 pulses, and therefore, the target distance is determined to be −2000 pulses. Exemplarily also, the actual position of the slave-manipulator motor for the previous cycle indicates 5000 pulses, the mapped position of the slave-manipulator motor for the current cycle indicates 2000 pulses, then the mapped motion distance is −3000 pulses. The planned motion trajectory of the slave-manipulator motor is to decelerate in the same direction as the starting velocity until the ending of the current cycle, when the velocity is still not decreased to zero and the end position indicates 8000 pulses, the maximum mapped distance $P_{cm}$ indicates 3000 pulses. According to the motion of the motor, it is known that the value that may be reached preferentially indicates 8000 pulses, therefore, the target distance is determined to be 3000 pulses. It should be noted that, in this application embodiment, both the mapped motion distance and the maximum planning distance $P_{cm}$ have the signs for indicating the directionality.

Step S106, determining, as the actual position of the slave-manipulator motor for the current cycle, a sum of the actual position of the slave-manipulator motor for the previous cycle and the target distance.

In this way, in the control method according to the embodiments of the present application, it is equivalent to adding a virtual axis between the master manipulator and the slave manipulator, and after processing the data through the virtual axis, the value that may be preferentially reached among the mapped motion distance and the maximum planning distance is transmitted to the slave-manipulator motor, so it is possible to avoid the problem of an error warning of the motor due to exceeding of a limit of the slave-manipulator motor caused by the master manipulator being directly mapped to the slave-manipulator motor, so that an excessive acceleration and velocity during motion of the master manipulator motion may be decreased to an acceptable level of the slave-manipulator motor while it is ensured that the overall trajectory remains substantially unchanged, thus prolonging a service life of the slave-manipulator motor.

After performing step S106, the control method according to embodiments of the present application may further include:

Step S107, determining actual three-dimensional coordinates of the slave manipulator for the current cycle based on the actual position of the slave-manipulator motor for the current cycle.

Step S108, detecting whether the actual three-dimensional coordinates are beyond maximal coordinates of the slave manipulator. If so, proceeding to step S109; and if not exceeded, proceeding to step S110.

Step S109, acquiring a corrected position of the slave-manipulator motor for the current cycle based on the maximal coordinates of the slave manipulator.

After detecting whether the actual three-dimensional coordinates are beyond the maximal coordinates of the slave, whether or not correction is performed on the actual position of the slave-manipulator motor for the current cycle, the following steps continue to be performed:

Step S110, detecting whether or not multi-axis motions of the respective ones of the slave manipulators of the master-slave-manipulator robot are synchronized for the current cycle. If not, proceeding to step S111; and if so, proceeding to step S116.

Step S111, acquiring the target position of the slave-manipulator motor on each slave manipulator by using an inverse kinematic solution method according to target three-dimensional coordinates of the respective ones of the slave manipulators for the current cycle and the mechanical structure of the master-slave-manipulator robot.

Step S112, acquiring the target three-dimensional coordinates of the master manipulator based on the target position of the slave-manipulator motor on each slave manipulator.

Step S113, detecting whether the target three-dimensional coordinates of the master manipulator are beyond the maximal coordinates of the master manipulator. If the target three-dimensional coordinates of the master manipulator are beyond the maximal coordinates of the master manipulator, proceeding to step S114; and if the target three-dimensional coordinates of the master manipulator are not beyond the maximal coordinates of the master manipulator, proceeding to step S115.

Step S114, correcting the three-dimensional coordinates of the master manipulator for the current cycle to the maximal coordinates of the master manipulator, and then returning to step S101 to reacquire the mapped position of each slave-manipulator motor for the current cycle.

Step S115, correcting the three-dimensional coordinates of the master manipulator for the current cycle to target three-dimensional coordinates of the master manipulator, then returning to step S101 to reacquire the mapped position of each slave-manipulator motor for the current cycle.

Step S116, detecting whether correction has been performed on the actual position of the slave-manipulator motor for the current cycle. If not, proceeding to step S117; and if so, proceeding to step S118.

Step S117, controlling the slave-manipulator motor to move to the actual position of the current cycle.

Step S118, controlling the slave-manipulator motor to move to a corrected position for the current cycle.

In this way, through the above manner, in the actual application, if it is found to affect the multi-axis synergy of the slave manipulator, a motion limitation parameter of the master manipulator may be obtained through forward and inverse kinematics solution for robot, and then re-perform a processing by a virtual axis algorithm according to the embodiments of the present application based on the motion limitation parameter of the master manipulator, and finally mapping to the various joints of the slave manipulator is performed, so that the problem of the multi-axis synergy occurring for the slave manipulator linkage under special circumstances may be effectively avoided.

Figure 4:
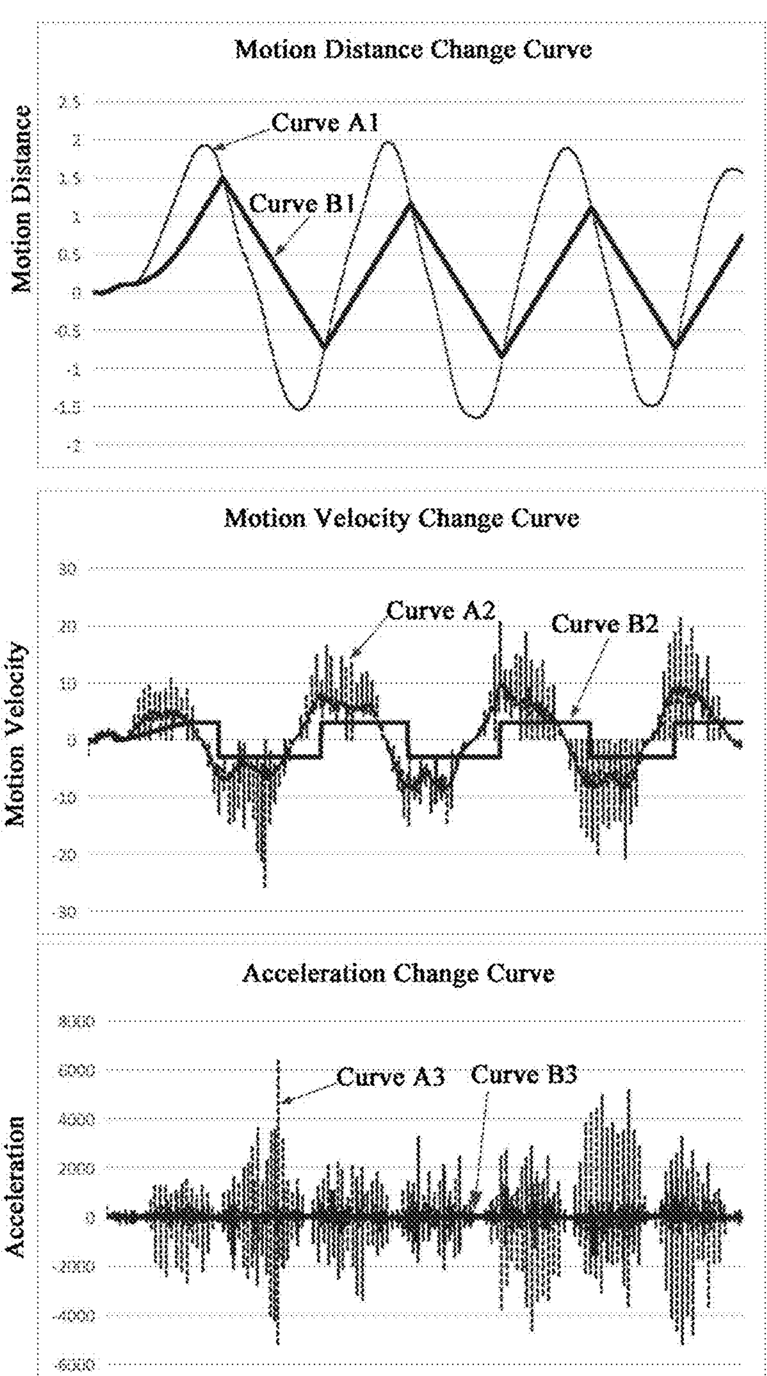
FIG. 4 shows a schematic comparative graph of comparing motion of a slave-manipulator motor according to the control method of the master-slave-manipulator robot according to the embodiment of the present application with motion of a slave-manipulator motor according to a control method of a conventional master-slave-manipulator robot.

FIG. 4 shows a schematic comparative graph of comparing motion of a slave-manipulator motor according to the control method of the master-slave-manipulator robot according to the embodiment of the present application with motion of a slave-manipulator motor according to a control method of a conventional master-slave-manipulator robot. As shown in FIG. 4, the horizontal axis of each curve is a point denoting a sampling cycle. Meanwhile, in a motion distance change curve, curve A1 is a motion distance change curve of the slave-manipulator motor obtained by using the control method of the conventional master-slave-manipulator robot (i.e., directly mapping from the master manipulator to the slave-manipulator motor); and curve B1 is a motion distance change curve of the slave-manipulator motor obtained by using the control method of the master-slave-manipulator robot according to embodiments of the present application. Curve A1 is a motion trajectory obtained directly from the motion mapping of the master manipulator, but the slave-manipulator motor is unable to realize this section of the trajectory due to insufficient motor capacity. After the processing method of the virtual axis is performed in the embodiments of the present application, the slave-manipulator motor in accordance with curve B1 substantially follows the motion trajectory of the master manipulator, where a slope (i.e., the motion velocity) is reduced as compared to original data of curve A1, in order to adapt to the actual motion capability of the slave-manipulator motor and to avoid the error warning. For a motion velocity change curve, curve A2 is a motion velocity change curve of the slave-manipulator motor obtained by using the control method of the conventional master-slave-manipulator robot; and curve B2 is a motion velocity change curve of the slave-manipulator motor obtained by using the control method of the master-slave-manipulator robot according to embodiments of the present application. The velocity in curve A2 is discrete with a significant sudden change, and is often large. In contrast, the velocity in curve B2 is more gentle, and when the maximal value of the slave-manipulator motor is reached, it no greater rises and maintains in a uniform motion. For an acceleration change curve, curve A3 is an acceleration change curve of the slave-manipulator motor obtained by using the control method of the conventional master-slave-manipulator robot; and curve B3 is an acceleration change curve of the slave-manipulator motor obtained by using the control method of the master-slave-manipulator robot according to embodiments of the present application. The acceleration in accordance with curve A3 is very large, which the slave-manipulator motor typical cannot reach. In contrast, the acceleration change in accordance with curve B3 is very small, with some sudden changes only when changing direction, and the motor will run more smoothly, without an error warning compared to the data in curve A3.

Described below are embodiments of a device according to the present application, which may be configured to perform the method according to embodiments of the present application. For details not disclosed for the device according to embodiments of the present application, refer to the method according to embodiments of the present application.

Figure 5:
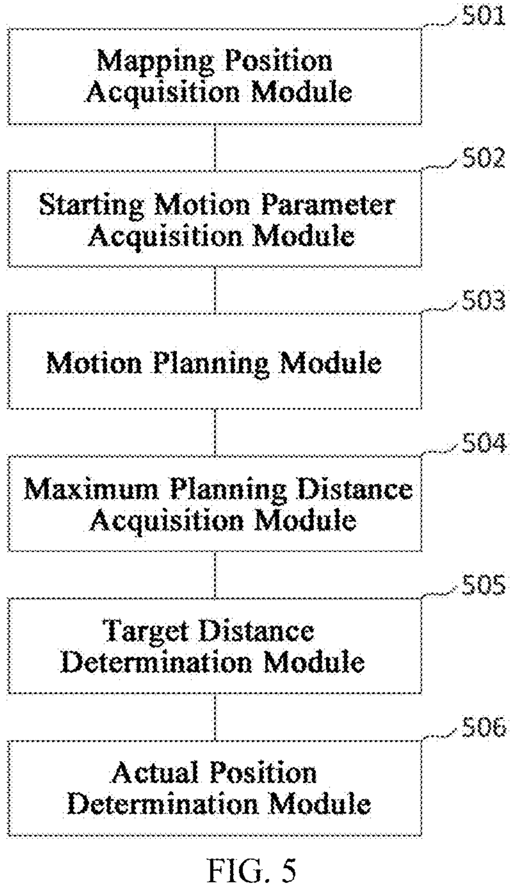
FIG. 5 shows a schematic diagram of a structure of a control device of a master-slave-manipulator robot according to an embodiment of the present application.

As an implementation of the above embodiments, embodiments of the present application provide a control device of a master-slave-manipulator robot, on a slave manipulator of which at least one slave-manipulator motor is provided, configured to control motion of the slave-manipulator motor. Referring to the schematic diagram of a structure shown in FIG. 5, the control device of the master-slave-manipulator robot according to the embodiments of the present application comprises: a mapping position acquisition module 501, a starting motion parameter acquisition module 502, a motion planning module 503, a maximum planning distance acquisition module 504, a target distance determination module 505, and an actual position determination module 506. In addition, the device may also comprise a slave-manipulator position detection module, a slave-manipulator motion control module and other more or less units and modules, and this embodiment does not limit the structure of the device.

The mapping position acquisition module 501 is configured to acquire a mapping position of the slave-manipulator motor for the current cycle, where the mapping position is used for indicating a number of mapped rotation pulses, which is mapped directly according to the three-dimensional coordinates of a master manipulator and a mechanical structure of the master-slave-manipulator robot, where the three-dimensional coordinates of the master manipulator are acquired at a preset acquisition cycle, and the current cycle is any acquisition cycle;

A starting motion parameter acquisition module 502 is configured to acquire a starting motion parameter of the slave-manipulator motor for the current cycle, wherein the starting motion parameter includes a starting velocity $V_s$ and a starting acceleration $A_s$;

A motion planning module 503 is configured to perform planning on a motion trajectory of the slave-manipulator motor for a current cycle based on the starting motion parameter;

A maximum planning distance acquisition module 504 is configured to acquire a maximum planning distance $P_{cm}$ of the slave-manipulator motor for the current cycle;

The target distance determination module 505 is configured to determine, as a target distance, a value that may be preferentially reached among a mapped motion distance and the maximum planning distance $P_{cm}$ from the actual position of the slave-manipulator motor for the previous cycle according to the starting motion parameter, where the mapped motion distance is a difference between the mapped position of the slave-manipulator motor for the current cycle and an actual position of the slave-manipulator motor in a previous cycle, the actual position being used for indicating a number of actual rotational pulses, and the previous cycle being the previous-one acquisition cycle of the current cycle;

The actual position determination module 506 is configured to determine, as an actual position of the slave-manipulator motor for the current cycle, a sum of the actual position of the slave-manipulator motor for the previous cycle and the target distance.

In one implementable way, the device further comprises:

A slave-manipulator position detection module is configured to determine actual three-dimensional coordinates of the slave manipulator for the current cycle based on the actual position of the slave-manipulator motor for the current cycle; and detect whether the actual three-dimensional coordinates are beyond maximal coordinates of the slave manipulator;

A slave-manipulator motion control module is configured to control the motion of the slave-manipulator motor to the actual position of the current cycle if the actual three-dimensional coordinates are not beyond the maximal coordinates of the slave manipulator.

In one implementable way, the slave-manipulator motion control module is further configured to: acquire a corrected position of the slave-manipulator motor for the current cycle based on the maximal coordinates of the slave manipulator if the actual three-dimensional coordinates are beyond the maximal coordinates of the slave manipulator; and control the slave-manipulator motor to move to the corrected position for the current cycle.

In one implementable way, the slave-manipulator motion control module is also configured to: before controlling the slave-manipulator motor to move, acquire the target position of the slave-manipulator motor on each slave manipulator by using an inverse kinematic solution method according to target three-dimensional coordinates of each slave manipulator for the current cycle and a mechanical structure of the master-slave-manipulator robot, if multi-axis motion of each slave manipulator of the master-slave-manipulator robot is not synchronized for the current cycle; acquire target three-dimensional coordinates of the master manipulator according to the target position of the slave-manipulator motor on each slave manipulator; correct the three-dimensional coordinates of the master manipulator for the current cycle to the maximal coordinates of the master manipulator, if the target three-dimensional coordinates of the master manipulator are beyond maximal coordinates of the master manipulator; reacquire, according to the maximal coordinates of the master manipulator, the mapped positions of the slave-manipulator motors for the current cycle until the actual positions of the slave-manipulator motor for the current cycle are re-determined.

In one implementable way, the slave-manipulator motion control module is further configured to:

correct the three-dimensional coordinates of the master manipulator for the current cycle to the target three-dimensional coordinates of the master manipulator and transmit the same back to the mapped position acquisition module 501, if the target three-dimensional coordinates of the master manipulator do not are beyond the maximal coordinates of the master manipulator.

In one implementable way, the starting motion parameter acquisition module 502 is specifically configured to:

acquire the actual positions of the slave-manipulator motor in the three acquisition cycles previous to the current cycle, respectively; determine the starting velocity $V_s$ and the starting acceleration $A_s$ based on the actual positions of the slave-manipulator motor in the three acquisition cycles previous to the current cycle.

In one implementable way, the starting motion parameter acquisition module 502 is specifically configured to:

determine a first average velocity of the slave-manipulator motor for the previous cycle based on a difference between a first actual position and a second actual position and a duration of the acquisition cycle, where the first actual position is an actual position of the slave-manipulator motor for the previous cycle, and the second actual position is an actual position of the slave-manipulator motor for a previous acquisition cycle of the previous cycle; determine a second average velocity of the slave-manipulator motor for the previous acquisition cycle of the previous cycle based on a difference between the second actual position and a third actual position and the duration of the acquisition cycle, where the third actual position is an actual position of the slave-manipulator motor in a third acquisition cycle previous to the current cycle; determine an average acceleration based on the second average velocity, the first average velocity, and the duration of the acquisition cycle; and determine the first average velocity as the starting velocity $V_s$, and determine the average acceleration as the starting acceleration $A_s$.

In one implementable way, the device further include: preceded by the motion planning module 503, a direction detection module configured to determine a first motion direction of the slave-manipulator motor for the current cycle based on the mapped position of the slave-manipulator motor for the current cycle and the actual position of the slave-manipulator motor for the previous cycle; determine a second motion direction of the slave-manipulator motor for the previous cycle based on the actual position of the slave-manipulator motor for the previous cycle and the actual position of the slave-manipulator motor in the previous acquisition cycle of the previous cycle; and detect whether the first motion direction is the same as the second motion direction.

In one implementable way, in the case where the first motion direction is the same as the second motion direction, the motion planning module 503 is specifically configured to:

detect whether the starting velocity $V_s$ is equal to the maximal velocity $V_m$ of the slave-manipulator motor, wherein if the starting velocity $V_s$ is equal to the maximal velocity $V_m$, perform planning for the motion trajectory of the slave-manipulator motor for the current cycle to perform a uniform motion at the maximal velocity $V_m$ until the ending of the current cycle.

In one implementable way, the motion planning module 503 is specifically also configured to:

detect whether the starting acceleration $A_s$ is equal to the maximal acceleration $A_m$, if the starting velocity $V_s$ is less than the maximal velocity $V_m$; if the starting acceleration $A_s$ is equal to the maximal acceleration $A_m$, determine a first duration required to uniformly accelerate to the maximal velocity $V_m$ from the starting velocity $V_s$ at the maximal acceleration $A_m$; perform planning on the motion trajectory of the slave-manipulator motor for the current cycle to uniformly accelerate to the maximal velocity $V_m$ at the maximal acceleration $A_m$, and then uniformly move at the maximal velocity $V_m$ for the remaining duration of the current cycle until the ending of the current cycle, if the first duration is less than that of the current cycle.

In one implementable way, the motion planning module 503 is specifically also configured to:

If the first duration is greater than the duration of the current cycle, perform planning on the trajectory of the slave-manipulator motor for the current cycle to accelerate uniformly at the maximal acceleration $A_m$ from the starting velocity $V_s$ until the ending of the current cycle.

In one implementable way, the motion planning module 503 is specifically also configured to:

determine a second duration required to accelerate to the maximal acceleration $A_m$ from the starting acceleration $A_s$ at the first jerk, if the starting acceleration $A_s$ is less than the maximal acceleration $A_m$; acquire an intermediate velocity at the ending of the second duration if the second duration is less than the duration of the current cycle; determine a third duration required to accelerate uniformly to the maximal velocity $V_m$ from the intermediate velocity at the maximal acceleration $A_m$, if the intermediate velocity is less than the maximal velocity $V_m$; and perform planning on the motion trajectory of the slave-manipulator motor for the current cycle to accelerate to the maximal acceleration $A_m$ at the first jerk, to accelerate uniformly to the maximal velocity $V_m$ at the maximal acceleration $A_m$, and then finally to move uniformly at the maximal velocity $V_m$ for the remaining duration of the current cycle until the ending of the current cycle, if a sum of the second duration and the third duration is less than the duration of the current cycle.

In one implementable way, the motion planning module 503 is specifically also configured to:

if the sum of the second duration and the third duration is greater than the duration of the current cycle, perform planning on the motion trajectory of the slave-manipulator motor for the current cycle to first accelerate to the maximal acceleration $A_m$ from the starting acceleration $A_s$, and then to accelerate uniformly at the maximal acceleration $A_m$ for the remaining duration of the current cycle until the ending of the current cycle.

In one implementable way, the motion planning module 503 is specifically also configured to:

perform planning on the trajectory of the slave-manipulator motor for the current cycle to perform a uniform jerk to the maximal velocity $V_m$ from the starting velocity $V_s$ at the first jerk, and then to move uniformly at the maximal velocity $V_m$ for the remaining duration of the current cycle until the ending of the current cycle, if the intermediate velocity is greater than the maximal velocity $V_m$.

In one implementable way, the motion planning module 503 is specifically also configured to:

determine an end velocity to which a uniform jerk is performed from the starting velocity $V_s$ at the first jerk until the ending of the current cycle, if the second duration is greater than the duration of the current cycle; and perform planning on the trajectory of the slave-manipulator motor for the current cycle to perform a uniform jerk from the starting velocity $V_s$ at the first jerk until the ending of the current cycle, if the end velocity is less than the maximal velocity $V_m$.

In one implementable way, the motion planning module 503 is specifically also configured to:

perform planning on the trajectory of the slave-manipulator motor for the current cycle to perform a uniform jerk to the maximal velocity $V_m$ from the starting velocity $V_s$ at the first jerk and to move uniformly at the maximal velocity $V_m$ for the remaining duration of the current cycle until the ending of the current cycle, if the end velocity is greater than the maximal velocity $V_m$, then for.

In one implementable way, the maximum planning distance acquisition module 504 is specifically configured to:

determine a total motion distance traveled by the slave-manipulator motor for the current cycle as the maximum planning distance $P_{cm}$ of the slave-manipulator motor for the current cycle.

In one implementable way, in the case where the first motion direction is opposite to the second motion direction, the motion planning module 503 is specifically configured to:

detect, based on the starting motion parameter and a second jerk, whether the slave-manipulator motor is able to decelerate to zero from the starting velocity $V_s$ for the current cycle; acquire an intermediate position and an intermediate acceleration of the slave-manipulator motor when it decelerates to zero from the starting velocity $V_s$, if the slave-manipulator motor is able to decelerate to zero from the starting velocity $V_s$ for the current cycle; perform planning on the motion trajectory of the slave-manipulator motor for the remaining duration of the current cycle based on the motion parameter of the slave-manipulator motor at the intermediate position and the remaining duration of the current cycle, wherein the starting velocity of the slave-manipulator motor at the intermediate position is zero and the starting acceleration is the intermediate acceleration.

In one implementable way, the motion planning module 503 is specifically also configured to:

detect whether the slave-manipulator motor is able to reach the maximum acceleration in the deceleration section for the current cycle, if the slave-manipulator motor is not able to decelerate to zero from the starting velocity $V_s$ for the current cycle; perform planning on the motion trajectory of the slave-manipulator motor for the current cycle to decelerate to the maximum acceleration in the deceleration section at the second jerk, and then decelerate uniformly at the maximum acceleration in the deceleration section for the remaining duration of the current cycle until the ending of the current cycle, if the slave-manipulator motor is able to reach the maximum acceleration in the deceleration section for the current cycle.

In one implementable way, the motion planning module 503 is specifically also configured to:

perform planning on the trajectory of the slave-manipulator motor for the current cycle to decelerate at the second jerk until the ending of the current cycle, if the slave-manipulator motor is not able to reach the maximum acceleration in the deceleration section for the current cycle.

In one implementable way, the maximum planning distance acquisition module 504 is specifically configured to:

acquire the end position of the slave-manipulator motor at the ending of the current cycle, and determine, as the maximum planning distance of the slave-manipulator motor for the current cycle $P_{cm}$, a difference between the end position and the actual position of the slave-manipulator motor for the previous cycle.

In this way, in the control method according to the embodiments of the present application, it is equivalent to adding a virtual axis between the master manipulator and the slave manipulator, and after processing the data through the virtual axis, the value that may be preferentially reached among the mapped motion distance and the maximum planning distance is transmitted to the slave-manipulator motor, so it is possible to avoid the problem of an error warning of the motor due to exceeding of a limit of the slave-manipulator motor caused by the master manipulator being directly mapped to the slave-manipulator motor, so that an excessive acceleration and velocity during motion of the master manipulator motion may be decreased to an acceptable level of the slave-manipulator motor while it is ensured that the overall trajectory remains substantially unchanged, thus prolonging a service life of the slave-manipulator motor.

The invention claimed is:

1. A control method of a master-slave-manipulator robot, characterized in that at least one slave-manipulator motor is provided on a slave manipulator of the master-slave-manipulator robot, and the method is used for controlling motion of the slave-manipulator motor and comprises:

acquiring a mapped position of the slave-manipulator motor for a current cycle, wherein the mapped position is used for indicating a number of mapped rotational pulses, which is acquired by direct mapping based on three-dimensional coordinates of a master manipulator of the master-slave-manipulator robot and a mechanical structure of the master-slave-manipulator robot, the three-dimensional coordinates of the master manipulator being acquired at a preset acquisition cycle, and the current cycle being any acquisition cycle;

acquiring a starting motion parameter of the slave-manipulator motor for the current cycle, the starting motion parameter comprising a starting velocity $V_s$ and a starting acceleration $A_s$;

performing planning on a motion trajectory of the slave-manipulator motor for the current cycle based on the starting motion parameter;

acquiring a maximum planning distance $P_{cm}$ of the slave-manipulator motor for the current cycle;

determining, as a target distance, a value that is able to be reached preferentially among a mapped motion distance and the maximum planning distance $P_{cm}$, from an actual position of the slave-manipulator motor for a previous cycle based on the starting motion parameter, wherein the mapped motion distance is a difference between the mapped position of the slave-manipulator motor for the current cycle and the actual position of the slave-manipulator motor for the previous cycle, the actual position being used for indicating a number of actual rotational pulses, and the previous cycle being a previous-one acquisition cycle of the current cycle; and determining, as an actual position of the slave-manipulator motor for the current cycle, a sum of the actual position of the slave-manipulator motor for a previous cycle and the target distance.

2. The method according to claim 1, characterized by further comprising:

determining actual three-dimensional coordinates of the slave manipulator for the current cycle based on the actual position of the slave-manipulator motor for the current cycle;

detecting whether the actual three-dimensional coordinates are beyond maximal coordinates of the slave manipulator; and if the actual three-dimensional coordinates are not beyond the maximal coordinates of the slave manipulator, controlling the slave-manipulator motor to move to the actual position for the current cycle.

3. The method according to claim 2, characterized by further comprising:

if the actual three-dimensional coordinates are beyond the maximal coordinates of the slave manipulator, acquiring a corrected position of the slave-manipulator motor for the current cycle based on the maximal coordinates of the slave manipulator; and controlling the slave-manipulator motor to move to a corrected position for the current cycle.

4. The method according to claim 2, characterized by further comprising: before controlling the slave-manipulator motor to move, if multi-axis motions of respective ones of the slave manipulators of the master-slave-manipulator robot are not synchronized for the current cycle, acquiring target positions of the slave-manipulator motors on the respective ones of the slave manipulators by using an inverse kinematic solution method based on target three-dimensional coordinates of the respective ones of the slave manipulators for the current cycle and the mechanical structure of the master-slave-manipulator robot;

acquiring target three-dimensional coordinates of the master manipulator based on the target position of the slave-manipulator motor on each of the slave manipulators;

if the target three-dimensional coordinates of the master manipulator are beyond maximal coordinates of the master manipulator, correct the three-dimensional coordinates of the master manipulator for the current cycle to the maximal coordinates of the master manipulator; and reacquiring, based on the maximal coordinates of the master manipulator, the mapped position of the slave-manipulator motor for the current cycle until the actual position of the slave-manipulator motor for the current cycle is re-determined.

5. The method according to claim 4, characterized by further comprising:

if the target three-dimensional coordinates of the master manipulator are not beyond the maximal coordinates of the master manipulator, correcting the three-dimensional coordinates of the master manipulator for the current cycle to the target three-dimensional coordinates of the master manipulator; and reacquiring, based on the target three-dimensional coordinates of the master manipulator, the mapped position of the slave-manipulator motor for the current cycle until the actual position of the slave-manipulator motor for the current cycle is re-determined.

6. The method according to claim 1, characterized in that the acquiring a starting motion parameter of the slave-manipulator motor for the current cycle comprises:

acquiring actual positions of the slave-manipulator motor for three acquisition cycles previous to the current cycle, respectively; and determining the starting velocity $V_s$ and the starting acceleration $A_s$ based on the actual positions of the slave-manipulator motor for the three acquisition cycles previous to the current cycle.

7. The method according to claim 6, characterized in that the determining the starting velocity $V_s$ and the starting acceleration $A_s$ based on the actual positions of the slave-manipulator motor for the three acquisition cycles previous to the current cycle comprises:

determining a first average velocity of the slave-manipulator motor for the previous cycle based on a difference between a first actual position and a second actual position and a duration of the acquisition cycle, the first actual position being an actual position of the slave-manipulator motor for the previous cycle, and the second actual position being an actual position of the slave-manipulator motor for the previous-one acquisition cycle of the previous cycle;

determining a second average velocity of the slave-manipulator motor for the previous-one acquisition cycle of the previous cycle based on a difference between the second actual position and a third actual position and the duration of the acquisition cycle, the third actual position being an actual position of the slave-manipulator motor for a third acquisition cycle previous to the current cycle;

determining an average acceleration based on the second average velocity, the first average velocity and the duration of the acquisition cycle; and determining the first average velocity as the starting velocity $V_s$, and determining the average acceleration as the starting acceleration $A_s$.

8. The method according to claim 1, characterized by further comprising: before performing planning on a motion trajectory of the slave-manipulator motor for the current cycle based on the starting motion parameter, determining a first motion direction of the slave-manipulator motor for the current cycle based on a mapped position of the slave-manipulator motor for the current cycle and an actual position of the slave-manipulator motor for the previous cycle;

determining a second motion direction of the slave-manipulator motor for the previous cycle based on the actual position of the slave-manipulator motor for the previous cycle and the actual position of the slave-manipulator motor for a previous-one acquisition cycle of the previous cycle; and detecting whether the first motion direction is the same as the second motion direction.

9. The method according to claim 8, characterized in that, when the first motion direction is the same as the second motion direction, the performing planning on a motion trajectory of the slave-manipulator motor for the current cycle based on the starting motion parameter comprises:

detecting whether the starting velocity $V_s$ is equal to the maximal velocity $V_m$ of the slave-manipulator motor, and if the starting velocity $V_s$ is equal to the maximal velocity $V_m$, performing planning on the motion trajectory of the slave-manipulator motor for the current cycle to move uniformly motion at the maximal velocity $V_m$ until ending of the current cycle.

10. The method according to claim 9, characterized by further comprising:

if the starting velocity $V_s$ is less than the maximal velocity $V_m$, detecting whether the starting acceleration $A_s$ is equal to the maximal acceleration $A_m$;

if the starting acceleration $A_s$ is equal to the maximal acceleration $A_m$, determining a first duration required to accelerate uniformly to the maximal velocity $V_m$ from the starting velocity $V_s$ at the maximal acceleration $A_m$; and if the first duration is less than a duration of the current cycle, performing planning on the motion trajectory of the slave-manipulator motor for the current cycle to first accelerate uniformly to the maximal velocity $V_m$ at the maximal acceleration $A_m$, and then to move uniformly at the maximal velocity $V_m$ for the remaining duration of the current cycle until the ending of the current cycle.

11. The method according to claim 10, characterized by further comprising:

if the first duration is greater than the duration of the current cycle, performing planning on the motion trajectory of the slave-manipulator motor for the current cycle to accelerate uniformly from the starting velocity $V_s$ at the maximal acceleration $A_m$ until the ending of the current cycle.

12. The method according to claim 10, characterized by further comprising:

if the starting acceleration $A_s$ is less than the maximal acceleration $A_m$, determining a second duration required to accelerate to the maximal acceleration $A_m$ from the starting acceleration $A_s$ at a first jerk;

if the second duration is less than the duration of the current cycle, acquiring an intermediate velocity at the ending of the second duration;

if the intermediate velocity is less than the maximal velocity $V_m$, determining a third duration required to accelerate uniformly to the maximal velocity $V_m$ from the intermediate velocity at the maximal acceleration $A_m$; and if a sum of the second duration and the third duration is less than the duration of the current cycle, performing planning on the motion trajectory of the slave-manipulator motor for the current cycle to first accelerate to the maximal acceleration $A_m$ at the first jerk, then to accelerate uniformly to the maximal velocity $V_m$ at the maximal acceleration $A_m$, and finally to move uniformly at the maximal velocity $V_m$ for the remaining duration of the current cycle until the ending of the current cycle.

13. The method according to claim 12, characterized by further comprising:

if the sum of the second duration and the third duration is greater than the duration of the current cycle, performing planning on the motion trajectory of the slave-manipulator motor for the current cycle to first accelerate to the maximal acceleration $A_m$ from the starting acceleration $A_s$, and then to accelerate uniformly at the maximal acceleration $A_m$ for the remaining duration of the current cycle until the ending of the current cycle.

14. The method according to claim 12, characterized by further comprising:

if the intermediate velocity is greater than the maximal velocity $V_m$, performing planning on the motion trajectory of the slave-manipulator motor for the current cycle to perform a uniform jerk to the maximal velocity $V_m$ from the starting velocity $V_s$ at the first jerk, and then to move uniformly at the maximal velocity $V_m$ for the remaining duration of the current cycle until the ending of the current cycle.

15. The method according to claim 12, characterized by further comprising:

if the second duration is greater than the duration of the current cycle, determining an end velocity to which a uniform jerk is performed from the starting velocity $V_s$ at the first jerk until the ending of the current cycle; and if the end velocity is less than the maximal velocity $V_m$, performing planning on the motion trajectory of the slave-manipulator motor for the current cycle to perform a uniform jerk from the starting velocity $V_s$ at the first jerk until the ending of the current cycle.

16. The method according to claim 15, characterized by further comprising:

if the end velocity is greater than the maximal velocity $V_m$, performing planning on the motion trajectory of the slave-manipulator motor for the current cycle to perform an uniform jerk to the maximal velocity $V_m$ from the starting velocity $V_s$ at the first jerk, and then to move uniformly at the maximal velocity $V_m$ for the remaining duration of the current cycle until the ending of the current cycle.

17. The method according to claim 9, characterized in that the acquiring a maximum planning distance $P_{cm}$ of the slave-manipulator motor for the current cycle comprises:

determining, as the maximum planning distance $P_{cm}$ of the slave-manipulator motor for the current cycle, a total motion distance traveled by the slave-manipulator motor for the current cycle.

18. The method according to claim 8, characterized in that, when the first motion direction is opposite to the second motion direction, said the performing planning on a motion trajectory of the slave-manipulator motor for the current cycle based on the starting motion parameter comprises:

detecting, based on the starting motion parameter and a second jerk, whether the slave-manipulator motor is able to decelerate to zero from the starting velocity $V_s$ for the current cycle;

if the slave-manipulator motor is able to decelerate to zero from the starting velocity $V_s$ for the current cycle, acquiring an intermediate position and an intermediate acceleration of the slave-manipulator motor when the slave-manipulator motor decelerates to zero from the starting velocity $V_s$; and performing planning on the motion trajectory of the slave-manipulator motor for the remaining duration of the current cycle based on the motion parameter of the slave-manipulator motor at the intermediate position and the remaining duration of the current cycle, wherein the slave-manipulator motor at the intermediate position has a starting velocity of zero and a starting acceleration as the intermediate acceleration.

19. The method according to claim 18, characterized by further comprising:

if the slave-manipulator motor is not able to decelerate to zero from the starting velocity $V_s$ for the current cycle, detecting whether the slave-manipulator motor is able to reach the maximum acceleration in a deceleration section for the current cycle; and if the slave-manipulator motor is able to reach the maximum acceleration in the deceleration section for the current cycle, performing planning on the motion trajectory of the slave-manipulator motor for the current cycle to first decelerate to the maximum acceleration in the deceleration section at the second jerk, and then to move by a uniform deceleration for the remaining duration of the current cycle until the ending of the current cycle.

20. The method according to claim 19, characterized by further comprising:

if the slave-manipulator motor is not able to reach the maximum acceleration in the deceleration section for the current cycle, performing planning on the motion trajectory of the slave-manipulator motor for the current cycle to move by a deceleration at the second jerk until the ending of the current cycle.

21. The method according to claim 18, characterized in that the acquiring a maximum planning distance $P_{cm}$ of the slave-manipulator motor for the current cycle comprises:

acquiring an end position of the slave-manipulator motor at the ending of the current cycle; and determining, as the maximum planning distance $P_{cm}$ of the slave-manipulator motor for the current cycle, a difference between the end position and the actual position of the slave-manipulator motor for the previous cycle.

22. A control device of a master-slave-manipulator robot, characterized in that at least one slave-manipulator motor is provided on a slave manipulator of the master-slave-manipulator robot, the device is configured to control motion of the slave-manipulator motor and comprises:

a mapping position acquisition module configured for acquiring a mapping position of the slave-manipulator motor for a current cycle, wherein the mapping position is used for indicating a number of mapped rotational pulses, which is acquired by direct mapping based on three-dimensional coordinates of the master manipulator and a mechanical structure of the master-slave-manipulator robot, the three-dimensional coordinates of the master manipulator being acquired at a preset acquisition cycle, and the current cycle being any acquisition cycle;

a starting motion parameter acquisition module configured for acquiring a starting motion parameter of the slave-manipulator motor for the current cycle, the starting motion parameter comprising a starting velocity $V_s$ and a starting acceleration $A_s$;

a motion planning module configured for performing planning on a motion trajectory of the slave-manipulator motor for the current cycle based on the starting motion parameter;

a maximum planning distance acquisition module configured for acquiring a maximum planning distance $P_{cm}$ of the slave-manipulator motor for the current cycle;

a target distance determination module configured for determining, as a target distance, a value that is able to be reached preferentially among a mapped motion distance and the maximum planning distance $P_{cm}$, from an actual position of the slave-manipulator motor for a previous cycle based on the starting motion parameter, wherein the mapped motion distance is a difference between the mapped position of the slave-manipulator motor for the current cycle and the actual position of the slave-manipulator motor for the previous cycle, the actual position being used for indicating a number of actual rotational pulses, and the previous cycle being a previous-one acquisition cycle of the current cycle; and an actual position determination module configured for determining, as an actual position of the slave-manipulator motor for the current cycle, a sum of the actual position of the slave-manipulator motor for a previous cycle and the target distance.

* * * * *